US005935188A

United States Patent [19]

Jaye

[11] Patent Number: 5,935,188

[45] Date of Patent: Aug. 10, 1999

[54] DETERMINATION OF WALL WETTING FOR A PORT INJECTED ENGINE

[75] Inventor: John R. Jaye, Northville, Mich.

[73] Assignee: Chrysler Corporation, Auburn Hills, Mich.

[21] Appl. No.: 08/863,709

[22] Filed: May 27, 1997

[51] Int. Cl.$^6$ .......................... G01M 15/00; F02D 41/14

[52] U.S. Cl. ...................... 701/104; 73/117.3; 73/119 A; 123/480; 701/103; 701/109

[58] Field of Search .................................... 701/101, 104, 701/103, 109; 123/480, 486, 488, 490, 491, 492; 73/116, 117.2, 117.3, 118.1, 119 A, 23.31, 23.32

[56] References Cited

U.S. PATENT DOCUMENTS

| | | | |
|---|---|---|---|
| 2,428,121 | 7/1947 | Minter | 73/23.31 |
| 4,357,923 | 11/1982 | Hideg | 123/492 |
| 4,446,830 | 5/1984 | Simko | 123/276 |
| 4,534,213 | 8/1985 | Mirikidani | 73/118.1 |
| 4,869,224 | 9/1989 | Ishikawa et al. | 73/116 |
| 5,392,745 | 2/1995 | Beck | 123/295 |
| 5,404,856 | 4/1995 | Servati | 123/478 |
| 5,474,052 | 12/1995 | Aquino et al. | 123/492 |
| 5,482,017 | 1/1996 | Brehob | 123/299 |
| 5,483,941 | 1/1996 | Cullen | 123/481 |
| 5,515,828 | 5/1996 | Cook | 123/436 |
| 5,584,277 | 12/1996 | Chen et al. | 123/480 |
| 5,690,087 | 11/1997 | Schumaker et al. | 123/675 |
| 5,819,714 | 10/1998 | Bush et al. | 701/104 |

*Primary Examiner*—George Dombroske
*Attorney, Agent, or Firm*—Kenneth H. Maclean

[57] ABSTRACT

A method is provided for determining wall wetting for an engine which includes running a multi-cylinder engine at a predetermined speed and load. The fuel delivery and spark to one of the cylinders is then interrupted. The hydrocarbon level exhausted from the cylinder is then measured for a predetermined number of engine cycles. The test results can then be curve fitted to the relationship HCPPM=(A+B* engine cycle)$^{(1/exp)}$. In this relationship, HCPPM is the hydrocarbon count in parts per million, A and B are each constants, and the exponent exp is derived using an iterative process. The exponent which is derived is the main qualifier for wall wetting.

4 Claims, 3 Drawing Sheets

FIG 3
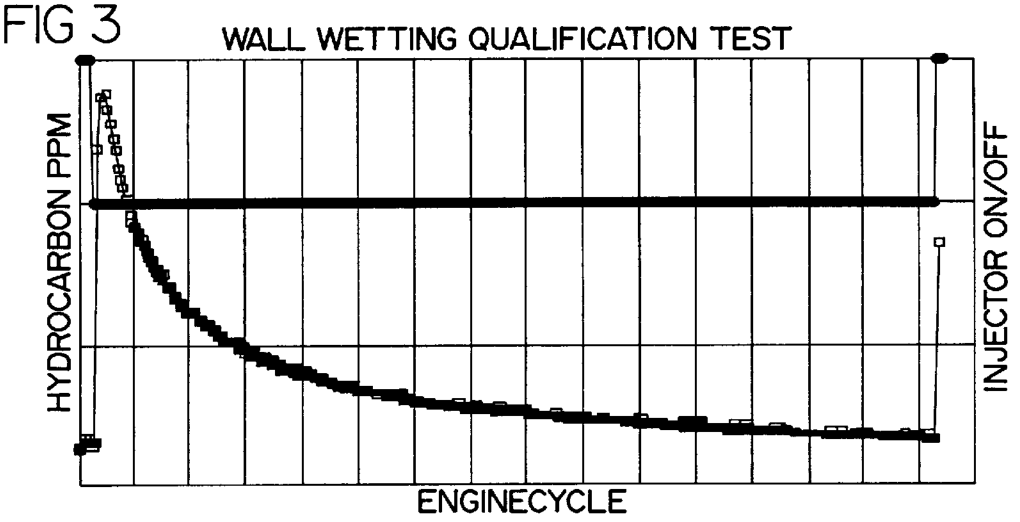
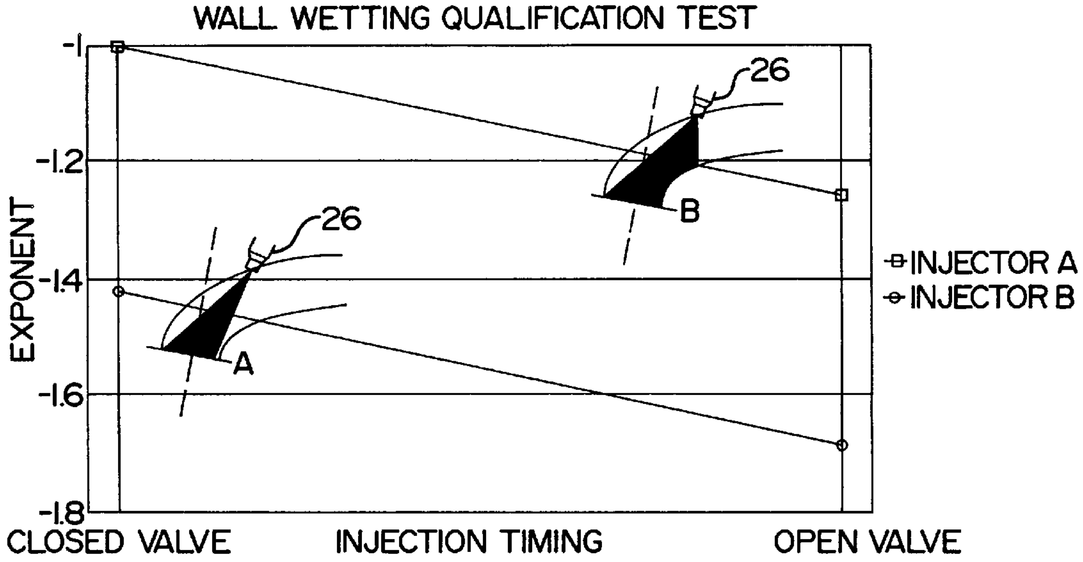
FIG 4
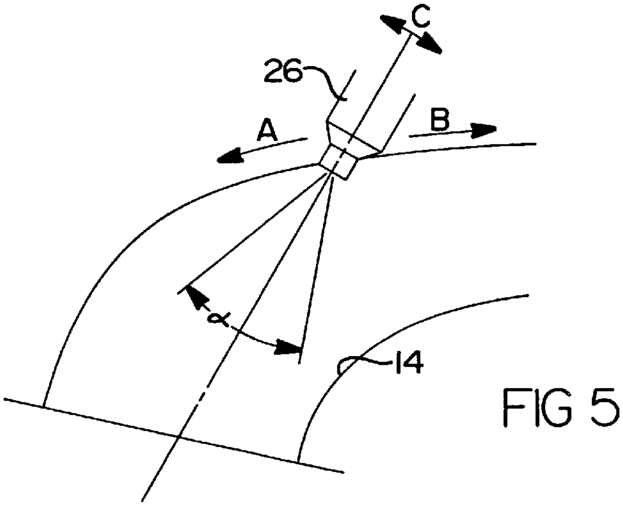
FIG 5

DETERMINATION OF WALL WETTING FOR A PORT INJECTED ENGINE

BACKGROUND OF THE INVENTION

1. Field of the Invention

The present invention relates to generally to fuel delivery systems, and more particularly, to a method of determining wall wetting for a port injected internal combustion engine.

2. Background and Summary of the Invention

Internal combustion engines are employed most efficiently and with minimal pollution when the correct fuel to air ratio is maintained. This is easier said than done, because transient conditions during engine operation make it difficult to determine the precise quantity of fuel that should be injected at any given instant. In a present-day fuel injection system, fuel is injected into the intake port of the fuel intake manifold. There, the fuel is mixed with air and introduced into the cylinder when the intake valve is opened. There are several factors which contribute to the efficient delivery of the fuel droplets into the cylinder. These factors include the injector targeting which includes the direction of fuel spray from the injector relative to the intake valve. Another factor is the injection timing which involves the start and finish times for injecting fuel relative to the times that the valve is opened and closed. The injection spray envelope is also an important factor in reducing wall wetting. An injection spray envelope which is too narrow causes a fuel droplet spray which does not properly mix with the air being induced. An injection spray envelope which is too wide causes fuel droplets to impinge against the walls of the intake manifold, thereby causing a film to develop on the wall. The droplet size of the injected fuel is also an important factor in wall wetting. For example, if the droplets are too large, they fail to mix properly with the induced air. Since the amount of wall wetting can have a great impact on the engine emissions and performance, a simple technique for quantifying or qualifying wall wetting would be welcome during the engine development process. Thus, the optimization of injector targeting, injection timing, injection spray envelope, and injection fuel droplet size can be obtained in order to reduce the engine emissions.

Accordingly, the present invention provides a method of determining wall wetting for an engine, which includes running a multi-cylinder (or single cylinder) engine at a predetermined speed and load. The fuel delivery and spark to one of the cylinders is then interrupted. The hydrocarbon level exhausted from the cylinder is then measured for a predetermined number of engine cycles. The test results can then be curve fitted to the relationship $HCPPM=(A+BN)^{(1/exp)}$. In this relationship, HCPPM is the hydrocarbon count in parts per million, A and B are each constants, N is the number of engine cycles after interrupt and the exponent "exp" is derived using an iterative process. The exponent which is derived is the main qualifier for wall wetting.

The apparatus for determining wall wetting for an engine according to the present invention includes a dynamometer attached to an output of the engine. A hydrocarbon level detector disposed in an exhaust passage of a cylinder of the engine. A fuel delivery and spark interrupting device is provided for interrupting fuel delivery and spark to the cylinder of the engine. A crank angle data acquisition device is provided for counting engine cycles of the engine. A processor is provided for curve fitting data obtained by the hydrocarbon level detector and the fuel delivery and spark interrupting device to the relationship $HCPPM=(A+BN)^{(1/exp)}$ and solving for the exponent exp.

The method of the present invention can be utilized for comparing different injector targeting, injection timing, injection spray envelope, and injected fuel droplet size set up arrangements. Thus, the method of the present invention provides a simple technique for optimization of each of these factors.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 3 is a sample plot of hydrocarbon parts per million versus engine cycle after the injector and spark are interrupted for a cylinder of an engine;

FIG. 4 is an example plot of the exponent versus injection timing for two different injectors which differ in spray angle and targeting characteristics, the injection timings being representative of closed valve (no air in fuel flow into the cylinder at the time of injection) and open valve (air and fuel flow into the cylinder during injection) injection; and FIG. 5 is an illustration of how the injector targeting and injection spray envelope can be varied.

DETAILED DESCRIPTION OF THE PREFERRED EMBODIMENTS

Figure 1:
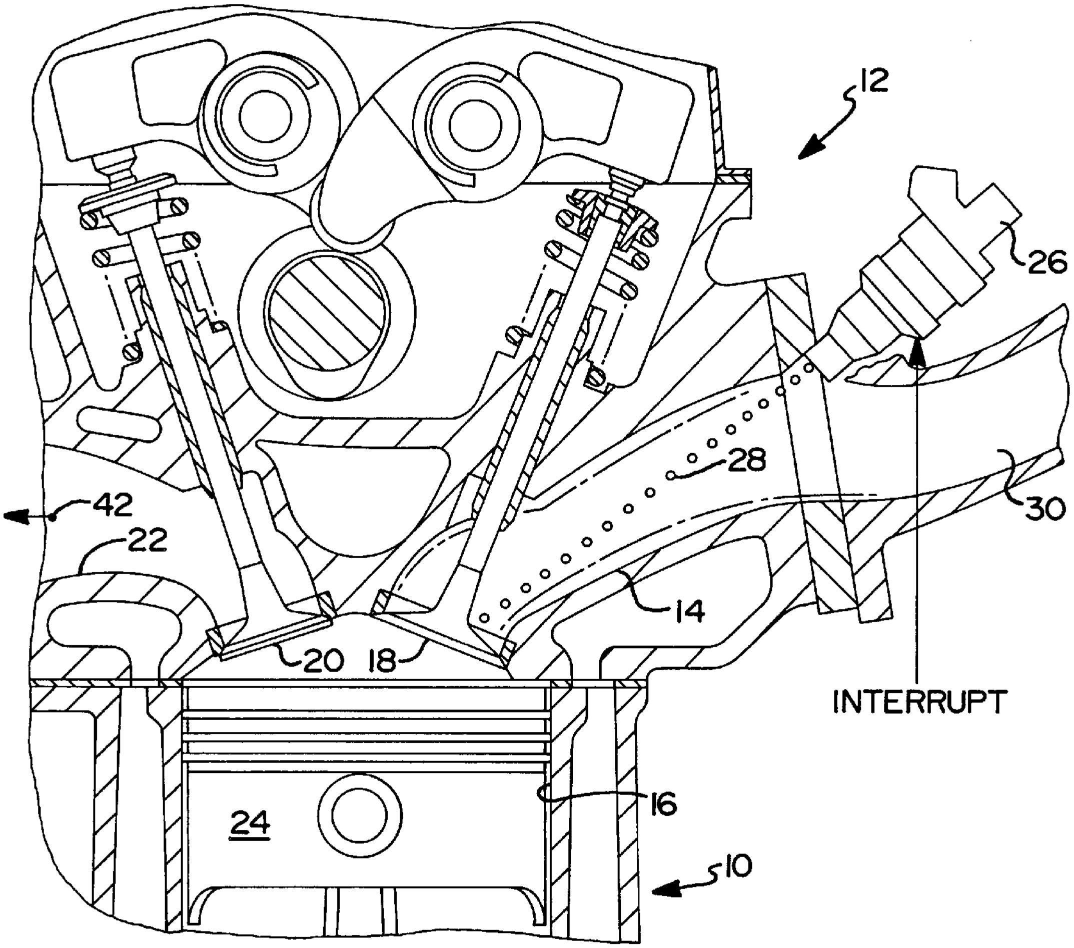
FIG. 1 is a partial cross-sectional view of an engine illustrating an exemplary fuel intake system.
Figure 2:
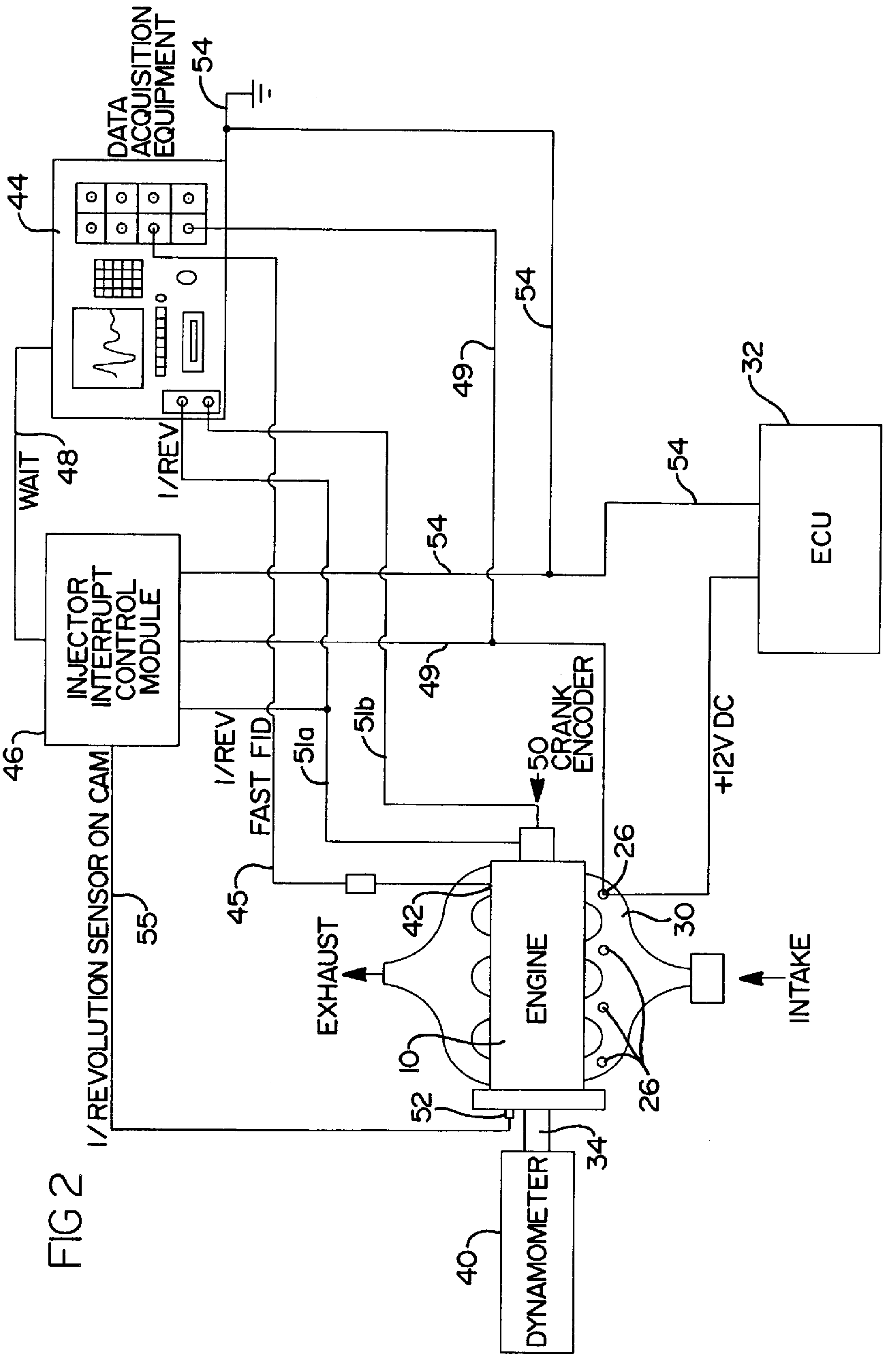
FIG. 2 is a schematic view of the test equipment utilized for determining wall wetting according to the principles of the present invention.

With reference to FIGS. 1 and 2, the method for determination of wall wetting for a port injected internal combustion engine will be described. In FIG. 1, a partial cross-sectional view of an engine 10 is shown including a fuel delivery system 12. The fuel delivery system 12 includes an intake port 14 which communicates with a cylinder 16 through an intake valve 18. Cylinder 16 also communicates with exhaust valve 20 which is disposed in exhaust port 22. In FIG. 1, piston 24 is shown at the top of its stroke and both valves 18, 20 are shown closed. It will be understood that the valves 18, 20 open and close in sequence to effect the combustion cycle. A fuel injector 26 is disposed in the intake port 14. Fuel injector 26 sprays fuel droplets 28 into the intake port 14. These droplets mix with air that is introduced through air intake manifold 30, forming a fuel-air mixture. As will be discussed below, some of the fuel vaporizes into the gaseous phase and some remains as droplets in the liquid phase. Fuel injector 26 is controlled by a microprocessor-based engine control system 32. Engine control unit 32 functions as a fuel quantity selector based upon engine speed, engine load and accelerator position.

According to the method of the present invention, the crankshaft 34 of engine 10 is connected to a dynamometer 40. Dynamometer 40 provides a load on the engine 10 that can be controlled. A fast flame ionization detector (fast FID) 42 includes a sample probe which is placed in the exhaust of a cylinder of the engine. The fast FID 42 is used to measure hydrocarbons in the exhaust, and is connected to data acquisition equipment 44 along line 45. An injector interrupt control module 46 is provided for interrupting the control signal to the fuel injector 26 of the cylinder equipped with the fast FID sample probe 42. The injector interrupt control module 46 is activated by the engineer of technician to start the data acquisition. The injector interrupt control module 46 sends a signal to the data acquisition equipment 44 along line 48 and sends an interrupt signal along line 49 to interrupt the control signal to the fuel injector 26. The interrupt signal is also supplied to the data acquisition equipment 44. A crank encoder 50 is provided for obtaining crank angle based data which is supplied to the injector interrupt control module 46 and data acquisition equipment 44. The crank encoder 50 provides 1/revolution data to the injector interrupt control module 46 and data acquisition equipment 44 via lines 51*a* and provides degrees of rotation information to the data acquisition equipment 44 via line 51*b*. A cam sensor 52 is provided for sensing the rotation of the cam which rotates at one half the rate of the crank 34. This signal is sent to the injector interrupt control module via line 55. Line 54 connects the engine control unit, injector interrupt control module 46 and data acquisition equipment 44 to ground. The data acquisition is configured to measure the peak value from the fast FID 42 for each contiguous engine cycle (two revolutions equals one cycle).

The test procedure to determine the wall wetting requires that the engine 10 be stabilized at a desired speed and load (injection quantity or pulse width is to be held constant). After stabilizing, the data acquisition is enabled and then the injector 26 is interrupted (no fuel is delivered to the selected cylinder). Measurements from the fast FID 42 are obtained for each contiguous engine cycle by data acquisition equipment 44. After an appropriate number of engine cycles, the data acquisition is stopped and the injector 26 is enabled. Typically 300 engine cycles are adequate for data acquisition, but the number can vary depending on engine speed, load and coolant temperature.

FIG. 3 shows a plot of the results of a sample test wherein hydrocarbon emissions in parts per million (HCPPM) are plotted against engine cycles (engine cycle). The plot obtained can be characterized by the equation $$HCPPM=(A+BN)^{(1/exp)};$$

where HCPPM is the hydrocarbon count in parts per million, A and B are each constants, N is the number of engine cycles after interrupt, and the exponent "exp" is derived using an iterative process. It is the exponent that is the main qualifier for wall wetting. The amount of wall wetting is increased as the exponent approaches negative 1. The constant B can also be used as an indicator, but only in cases of a poor engine design. An example using the technique is shown in FIG. 4. Here, two different injectors A and B are compared at two different injection timings. The injectors A and B differ in spray angle and targeting characteristics. A sketch of the spray angle and targeting of injection nozzles A and B are superimposed in the plot of FIG. 4. The injection timings utilized in the example are representative of closed valve (no air in fuel flow into the cylinder at the time of injection) and open valve (air and fuel flow into the cylinder during injection) injection.

From FIG. 4, it is recognized that the targeting characteristics of injector A wherein the spray angle is narrower and the targeting is directly at the input port results in a wall wetting which is reduced as compared to injector B which has a wider spray angle and has a targeting characteristic that directs fuel toward the wall of the input port.

In the example shown above, the injector targeting and injection spray envelope differed in the two spray injectors tested. It should be recognized, however, that the method of the present invention can also be utilized for optimization of injection timing and of injected fuel droplet size. In other words, with respect to FIG. 5, the spray envelope angle $\alpha$ can be varied and tested in order to determine if the wall wetting, i.e. the exponent (exp), is increased or decreased. In addition, the location of the injector 26 relative to the port 14 can be adjusted in the directions A and B. Furthermore, the injector 26 can be pivoted in the direction of arrow C in order to adjust the targeting. In order to determine the optimal injector targeting or injection spray envelope, the method of the present invention may be utilized to determine wall wetting for each adaptation.

According to the present invention, the exponent (exp) derived from the testing data allows a certain adaptation to be quantified with respect to wall wetting relative to other set ups or designs. Furthermore, the targeting angle and physical location of the injector with respect to the valve can be adapted and tested in order to optimize the targeting angle and location of the injector. In addition, the injection timing can be tested at various intervals with respect to the opening and closing of the input valve 18 so that the optimum timing can be obtained. The cone angle $\alpha$ or envelope of the injector can also be modified and tested so that the optimum spray envelope can be determined. Finally, the droplet size can also be modified and tested relatively easily so that the optimum droplet size can be determined for individual engine designs.

By optimizing the injector targeting, injection timing, injection spray envelope and injected fuel droplet size in order to reduce wall wetting, the engine hydrocarbon emissions are also reduced. The method of the present invention could also be utilized to better understand the fuel and air introduction process. The improved understanding of the fuel and air introduction process also will lead to improved computer models of the fuel and air introduction process and aid in engine calibration and vehicle calibration in order to reduce wall wetting under various operating conditions. For example, U.S. Pat. No. 5,584,277 issued to Chen et al and commonly assigned to the Assignee of the present application provides a fuel delivery control system which monitors engine speed and load parameters to develop a wall wetting history that is indicative of the physical state of the fuel within the intake port or intake manifold. The method of the present invention can be utilized in conjunction with the invention of U.S. Pat. No. 5,584,277 in order to generate the wall wetting history data that is utilized to optimize performance on a cycle by cycle basis.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of determining wall wetting for an engine, comprising the steps of:

(a) running an engine at a predetermined speed and load;

(b) interrupting fuel delivery and spark to at least one cylinder of said engine;

(c) measuring the hydrocarbons in the exhaust for a predetermined number of engine cycles; and (d) curve fitting data obtained by said measuring step to a relationship $HCPPM=(A+BN)^{(1/exp)}$ and solving for the exponent exp where HCPPM is hydrocarbon count in parts per million, A and B are constants and N is the number of engine cycles after the fuel delivery is interrupted.

2. The method according to claim 1, wherein said exponent exp is determined by an iterative process.

3. The method according to claim 1, further comprising the step of modifying one of an injector targeting, injector timing, injection spray envelope and droplet size of injected fuel, repeating steps a–d and comparing the exponent exp from an initial wall wetting determination and a modified engine wall wetting determination.

4. An apparatus for determining wall wetting for an engine, comprising:

a dynamometer attached to an output of said engine;

a hydrocarbon level detector disposed in an exhaust passage of a cylinder of said engine;

a fuel delivery and spark interrupting device for interrupting fuel delivery and spark to said cylinder of said engine;

a crank angle data acquisition device for counting engine cycles of said engine; and a processor for curve fitting data obtained by said hydrocarbon level detector and said fuel delivery and spark interrupting device to a relationship $HCPPM=(A+BN)^{(1/exp)}$ and solving for the exponent exp where HCPPM is hydrocarbon count in parts per million, A and B are constants and N is the number of engine cycles after the fuel delivery is interrupted.

* * * * *